(12) United States Patent
Pachner et al.

(10) Patent No.: US 11,053,875 B2
(45) Date of Patent: Jul. 6, 2021

(54) SYSTEM AND METHOD FOR ESTIMATING TURBO SPEED OF AN ENGINE

(71) Applicant: GARRETT TRANSPORTATION I INC., Torrance, CA (US)

(72) Inventors: Daniel Pachner, Prague (CZ); Yuejiang Liu, Beijing (CN); François-Xavier Brulhart, Cartigny (CH); Michael Robert Uchanski, Vevey (CH)

(73) Assignee: Garrett Transportation I Inc., Torrance, CA (US)

( * ) Notice: Subject to any disclaimer, the term of this patent is extended or adjusted under 35 U.S.C. 154(b) by 764 days.

(21) Appl. No.: 15/040,960

(22) Filed: Feb. 10, 2016

(65) Prior Publication Data
US 2017/0226948 A1   Aug. 10, 2017

(51) Int. Cl.
*F02D 41/14* (2006.01)
*F02D 41/00* (2006.01)
*F02B 37/12* (2006.01)
*F02D 9/02* (2006.01)
*F02D 9/10* (2006.01)
(Continued)

(52) U.S. Cl.
CPC .......... *F02D 41/1401* (2013.01); *F02B 37/12* (2013.01); *F02D 9/02* (2013.01); *F02D 9/105* (2013.01); *F02D 41/0007* (2013.01); *F02D 41/263* (2013.01); *F02M 35/104* (2013.01); *F02M 35/1038* (2013.01); *F02M 35/10386* (2013.01); *G01M 15/14* (2013.01); *F02B 2037/122* (2013.01); *F02D 2041/1416* (2013.01); *F02D 2041/1433* (2013.01); *F02D 2200/0402* (2013.01);
(Continued)

(58) Field of Classification Search
CPC .................................................. F02D 41/1401
See application file for complete search history.

(56) References Cited

U.S. PATENT DOCUMENTS 6,155,050 A    12/2000  Blanz et al.
6,401,457 B1    6/2002  Wang et al.
(Continued)

FOREIGN PATENT DOCUMENTS

DE   102005007558   9/2005
DE   102005008030   3/2006
(Continued)

OTHER PUBLICATIONS

Andersson, "Air Charge Estimation in Turbocharged Spark Ignition Engines," Linkoping Studies in Science and Technology, Thesis No. 989, 245 pages, 2005.
(Continued)

*Primary Examiner* — John E Breene
*Assistant Examiner* — Jeffrey C Morgan
(74) *Attorney, Agent, or Firm* — Seager, Tufte & Wickhem LLP (57) ABSTRACT

The speed of a turbocharger may be estimated using data from sensors that are readily available in most engine management systems. In some cases, a pressure measurement from a MAP sensor may be used, in combination with one or more computational models, to provide an efficient, lower cost estimate of turbo speed that can be used to control operation of the engine and/or the turbocharger.

20 Claims, 6 Drawing Sheets

(51) Int. Cl.
  *F02D 41/26* (2006.01)
  *F02M 35/10* (2006.01)
  *F02M 35/104* (2006.01)
  *G01M 15/14* (2006.01)

(52) U.S. Cl.
  CPC .......... *F02D 2200/0404* (2013.01); *F02D 2200/0406* (2013.01); *F02D 2200/0414* (2013.01); *Y02T 10/12* (2013.01)

(56) References Cited

U.S. PATENT DOCUMENTS

| | | | |
|---|---|---|---|
| 6,530,754 | B2 | 3/2003 | Vogel |
| 6,539,714 | B1 | 4/2003 | Wang |
| 6,557,347 | B1 | 5/2003 | Alvarez et al. |
| 6,804,601 | B2 | 10/2004 | Wang et al. |
| 7,007,472 | B2 | 3/2006 | Baize et al. |
| 7,100,375 | B2 | 9/2006 | Baize et al. |
| 7,127,892 | B2 | 10/2006 | Akins et al. |
| 7,265,542 | B2 | 9/2007 | Hrubes |
| 7,283,923 | B2 | 10/2007 | Barila et al. |
| 7,296,562 | B2 | 11/2007 | Withrow et al. |
| 7,372,553 | B2 | 5/2008 | Aoshima et al. |
| 7,380,401 | B2 | 6/2008 | Henn et al. |
| 7,380,446 | B2 | 6/2008 | Baeuerle et al. |
| 7,730,724 | B2 | 6/2010 | Shu et al. |
| 7,748,217 | B2 | 7/2010 | Muller |
| 7,769,522 | B2 | 8/2010 | Adreae et al. |
| 7,861,580 | B2 | 1/2011 | Sujan et al. |
| 8,061,137 | B2 | 11/2011 | Evans |
| 8,191,370 | B2 | 6/2012 | Shimizu et al. |
| 8,205,503 | B2 | 6/2012 | Cox |
| 8,291,752 | B2 | 10/2012 | Bierl et al. |
| 8,504,321 | B2 | 8/2013 | Seidel et al. |
| 8,567,192 | B2 | 10/2013 | Chi et al. |
| 8,567,238 | B2 | 10/2013 | Serra et al. |
| 8,640,459 | B2 | 2/2014 | Ge et al. |
| 8,676,534 | B2 | 3/2014 | Serra et al. |
| 8,769,936 | B2 | 7/2014 | Petrovic et al. |
| 8,892,332 | B2 | 11/2014 | Chi et al. |
| 9,010,180 | B2 | 4/2015 | Petrovic et al. |
| 9,121,862 | B2 | 9/2015 | Reitmeier et al. |
| 9,133,792 | B2 | 9/2015 | Cianflone et al. |
| 9,175,597 | B2 | 11/2015 | Katsumata et al. |
| 2006/0064231 | A1 | 3/2006 | Fekete et al. |
| 2007/0068159 | A1* | 3/2007 | Ueno ............ F02D 41/1401 60/605.2 |
| 2008/0053087 | A1 | 3/2008 | Swenson et al. |
| 2009/0133399 | A1 | 5/2009 | Keyes et al. |
| 2012/0016602 | A1 | 1/2012 | Fontvieille et al. |
| 2012/0179356 | A1 | 7/2012 | Ide et al. |
| 2014/0123938 | A1 | 5/2014 | Whitney et al. |
| 2015/0034046 | A1 | 2/2015 | Takahashi et al. |
| 2015/0057909 | A1 | 2/2015 | Chi et al. |
| 2015/0101578 | A1 | 4/2015 | Suchy et al. |
| 2015/0110650 | A1 | 4/2015 | Christmann |
| 2015/0114096 | A1 | 4/2015 | Eichel |
| 2015/0159544 | A1 | 6/2015 | Cowgill et al. |
| 2015/0204341 | A1 | 7/2015 | Chekansky |
| 2015/0276785 | A1 | 10/2015 | Nau et al. |
| 2015/0308859 | A1 | 10/2015 | Lerchenmueller |
| 2015/0337747 | A1 | 11/2015 | De Cesare et al. |

FOREIGN PATENT DOCUMENTS

| | | | |
|---|---|---|---|
| DE | 102008022083 | A1 | 11/2008 |
| DE | 102010039532 | | 2/2012 |
| DE | 102012213961 | | 3/2014 |
| DE | 10201401947 | | 1/2015 |
| EP | 1837512 | * | 9/2007 |
| EP | 1837512 | A1 | 9/2007 |
| EP | 1977086 | | 5/2009 |
| EP | 2648001 | | 9/2013 |
| GB | 2499852 | | 4/2013 |
| WO | 2008068098 | | 6/2008 |
| WO | 2009028003 | | 3/2009 |
| WO | 2009056725 | | 5/2009 |
| WO | 2013031919 | | 3/2013 |
| WO | 2014002464 | | 1/2014 |
| WO | 2015027348 | | 3/2015 |
| WO | 2015097505 | | 7/2015 |

OTHER PUBLICATIONS

Garrett, "Turbo Tech 103 (Expert)," 12 pages, downloaded Feb. 23, 2016.

Muller, "Estimation and Control of Turbocharged Engines," SAE Technical Paper Series 2008-01-1013, 2008 World Congress, 16 pages, Apr. 14-17, 2008.

Storset et al., "Adaptive Air Charge Estimation for Turbocharged Diesel Engine," 39 pages, Sep. 15, 2003.

Extended European Search Report for EP Application No. 17152074.5, dated Jun. 30, 2017.

* cited by examiner

SYSTEM AND METHOD FOR ESTIMATING TURBO SPEED OF AN ENGINE

TECHNICAL FIELD

The present disclosure pertains generally to automotive engine controls, and more particularly pertains to estimating the rotation speed of a turbocharger of the engine.

BACKGROUND

The speed at which a turbocharger rotates is an important parameter in controlling operation of turbocharged engines. The maximum turbo speed may define a maximum achievable air flow, which in turn defines a maximum achievable torque of the engine. Exceeding the maximum turbo speed can lead to mechanical damage to the turbocharger and can ultimately lead to engine failure. A goal in controlling operation of some turbocharged engines, therefore, is the ability to achieve a high turbo speed without exceeding the maximum allowed speed.

In some cases, the turbo speed may be directly measured by a dedicated speed sensor that may, for example, utilize blade counting or the like. This tends to be an expensive solution. In some cases, a less expensive alternative is to estimate the turbo speed using inputs from other sensors utilized in engine management. For example, the turbo speed may be estimated using mass air flow, compressor inlet pressure, compressor outlet pressure and compressor inlet temperature. In some cases, these values may be related via a compressor map in which the turbo speed may simply be looked up once the other values are measured and known.

A shortcoming of this estimation method is that a compressor outlet pressure sensor must be placed at the output of the turbo's compressor. Most contemporary engine designs do not include a compressor outlet pressure sensor. Thus, the addition of the compressor outlet pressure sensor may increase the cost of the engine management system, and may even reduce the reliability of the system since there is an additional failure mechanism.

SUMMARY

Modern vehicles often include a Manifold Absolute Pressure (MAP) sensor for sensing the pressure at the intake manifold of the engine. The MAP sensor is often used to control the operation of the engine. The MAP sensor is typically located at the intake manifold of the engine, and for engines with a turbocharger, the MAP sensor is typically located downstream of the turbocharger's compressor outlet, and in most cases downstream of the engine's throttle valve. In some cases, a charge air cooler is disposed between the compressor outlet and the throttle valve. The charge air cooler, when provided, may cool the compressed air provided by the compressor in order to provide a more dense intake charge into the engine, which can increase the power output of the engine. The present disclosure relates to techniques for estimating the turbo speed of a turbocharger using data from a pressure sensor that is located downstream of the throttle valve, such as the MAP sensor, instead of a compressor outlet pressure sensor that is located at the output of the compressor. This approach may reduce the cost and increase the reliability of the engine management system.

In a particular example of the present disclosure, a controller may be used to estimate an operating speed of a turbocharger that has a compressor with an air inlet and an air outlet. The compressor feeds compressed air to a downstream throttle that provides a throttled air flow to an air intake manifold of an engine. The controller may include an inlet port, an outlet port and a processor that is operatively coupled to the inlet port and the outlet port. In some cases, the inlet port may receive one or more of a compressor air flow signal that represents a measure of air flow through the compressor, a compressor air inlet pressure signal that represents a measure of pressure at the air inlet of the compressor, an intake manifold pressure signal that represents a measure of pressure at the air intake manifold of the engine, a temperature signal that represents the temperature of the air at the throttle, and a throttle signal that represents the throttle position of the throttle. In some cases, the controller may include a memory that stores instructions that are executable by the processor to estimate the operating speed of the turbocharger based at least in part on the values received by the inlet port. In some cases, the processor may provide one or more control signals via the output port to control an operation of the turbocharger and/or the engine in response to the estimated operating speed of the turbocharger.

In another example of the present disclosure, a controller may be used to estimate an operating speed of a turbocharger that has a compressor with an air inlet and an air outlet. The compressor feeds compressed air to a downstream throttle that provides a throttled air flow to an air intake manifold of an engine. The controller may include an inlet port, an outlet port and a processor that is operatively coupled to the inlet port and the outlet port. In some cases, the inlet port may receive one or more of a compressor air flow signal that represents a measure of air flow through the compressor, a compressor air inlet pressure signal that represents a measure of pressure at the air inlet of the compressor, an intake manifold pressure signal that represents a measure of pressure at the air intake manifold of the engine and a throttle signal that represents the throttle position of the throttle. In some cases, the controller may include a memory that stores instructions that are executable by the processor to estimate an air pressure at the air outlet of the compressor using a throttle model that references at least the throttle signal and the measure of pressure at the air intake manifold of the engine. The controller may further estimate the operating speed of the turbocharger using a turbocharger model that references at least the measure of air flow through the compressor, the measure of pressure at the air inlet of the compressor and the estimated air pressure at the air outlet of the compressor. In some cases, the processor may provide one or more control signals via the output port to control an operation of the turbocharger and/or the engine in response to the estimated operating speed of the turbocharger.

The above summary is not intended to describe each disclosed embodiment or every implementation of the present disclosure. The Figures, and Detailed Description, which follow, more particularly exemplify some of these embodiments.

BRIEF DESCRIPTION OF THE FIGURES

The disclosure may be more completely understood in consideration of the following detailed description in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

Figure 1:
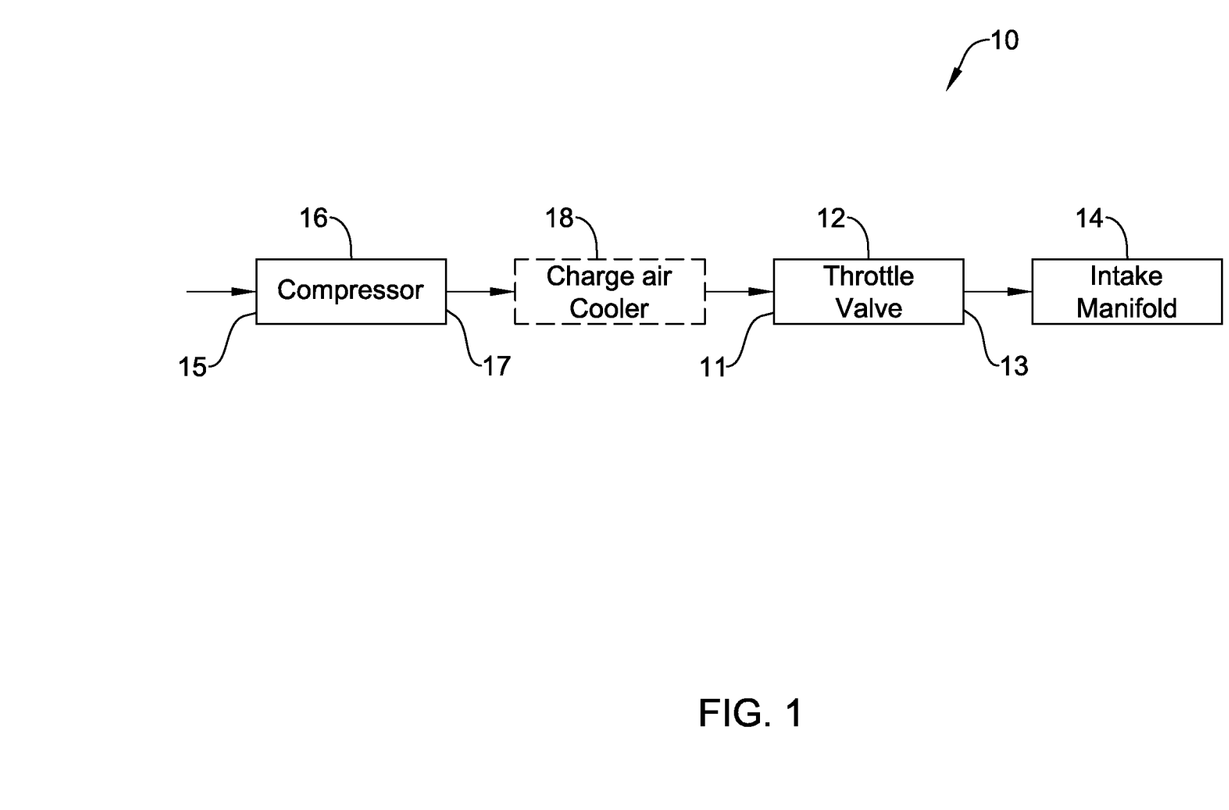
FIG. 1 is a schematic diagram of an air inlet system of an engine encompassing a turbocharger in accordance with an illustrative embodiment of the present disclosure.

The following description should be read with reference to the drawings in which similar structures in different drawings are numbered the same. The drawings, which are not necessarily to scale, depict illustrative embodiments and are not intended to limit the scope of the disclosure. FIG. 1 is a schematic illustration of an air inlet system 10 that may, for example, be used in combination with any suitable gasoline and/or diesel-powered engine. It will be appreciated that in some cases the air inlet system 10 may include additional components not shown in FIG. 1. As illustrated, the air inlet system 10 may include a throttle valve 12 that is positioned upstream of an air intake manifold 14. The throttle valve has an air inlet 11 and an air outlet 13. Air entering the air intake manifold 14 can be mixed with fuel and fed into the combustion chambers via one or more intake valves disposed atop each engine cylinder. In some engines, known as direct injection engines, fuel may be directly injected into each engine cylinder. In these engines, fuel is not mixed with air within the air intake manifold 14 itself.

In some cases, the throttle valve 12 may be opened further, to provide additional air, or at least partially closed, to provide less air, in response to a throttle command signal emanating from an engine management system (not shown). The engine management system may provide a command signal to change the position of the throttle valve 12 in response to the driver pushing harder on the accelerator pedal, or perhaps taking their foot off the accelerator pedal. In some cases, the engine management system may provide a throttle command signal to change the position of the throttle valve 12 in order to maintain a desired speed in response to a cruise control system (not shown). While the engine management system is generally referenced herein as a unitary control structure, it will be appreciated that in actuality, the engine management system may include a number of distinct computers, controllers, processors, sensors and the like.

Moving upstream in the illustrative air inlet system 10, air entering the air inlet system 10 is provided to a compressor 16 of a turbocharger. The compressor 16 includes an air inlet 15 and an air outlet 17. It will be appreciated that compressor 16 is disposed within the air intake flow. The turbocharger will typically also include a drive turbine (not shown) that is disposed within an exhaust gas flow of the engine. Gases within the exhaust flow cause the drive turbine to rotate. The drive turbine typically drives the compressor 16 via a compressor drive shaft. The compressor 16, which is disposed within the air intake flow, rotates via the aforementioned shaft. As the compressor 16 rotates, it draws air through the air inlet 15, compresses the air, and provides the compressed air to the air outlet 17. Air entering the compressor 16 at the air inlet 15 is generally at or close to ambient pressure, while air exiting the compressor 16 at the air outlet 17 is at an increased pressure relative to ambient pressure. The air passing through the compressor 16 may be heated as a result of being compressed, as well through some engine heating. Accordingly, in some cases, while not required, a charge air cooler 18 may be disposed downstream of the compressor 16 in order to cool the air before it reaches the throttle valve 12 and the air intake manifold 14 of the engine. The charge air cooler 18, when provided, may cool the compressed air provided by the compressor 16 in order to provide a more dense intake charge into the engine, which can increase the power output of the engine.

Figure 2:
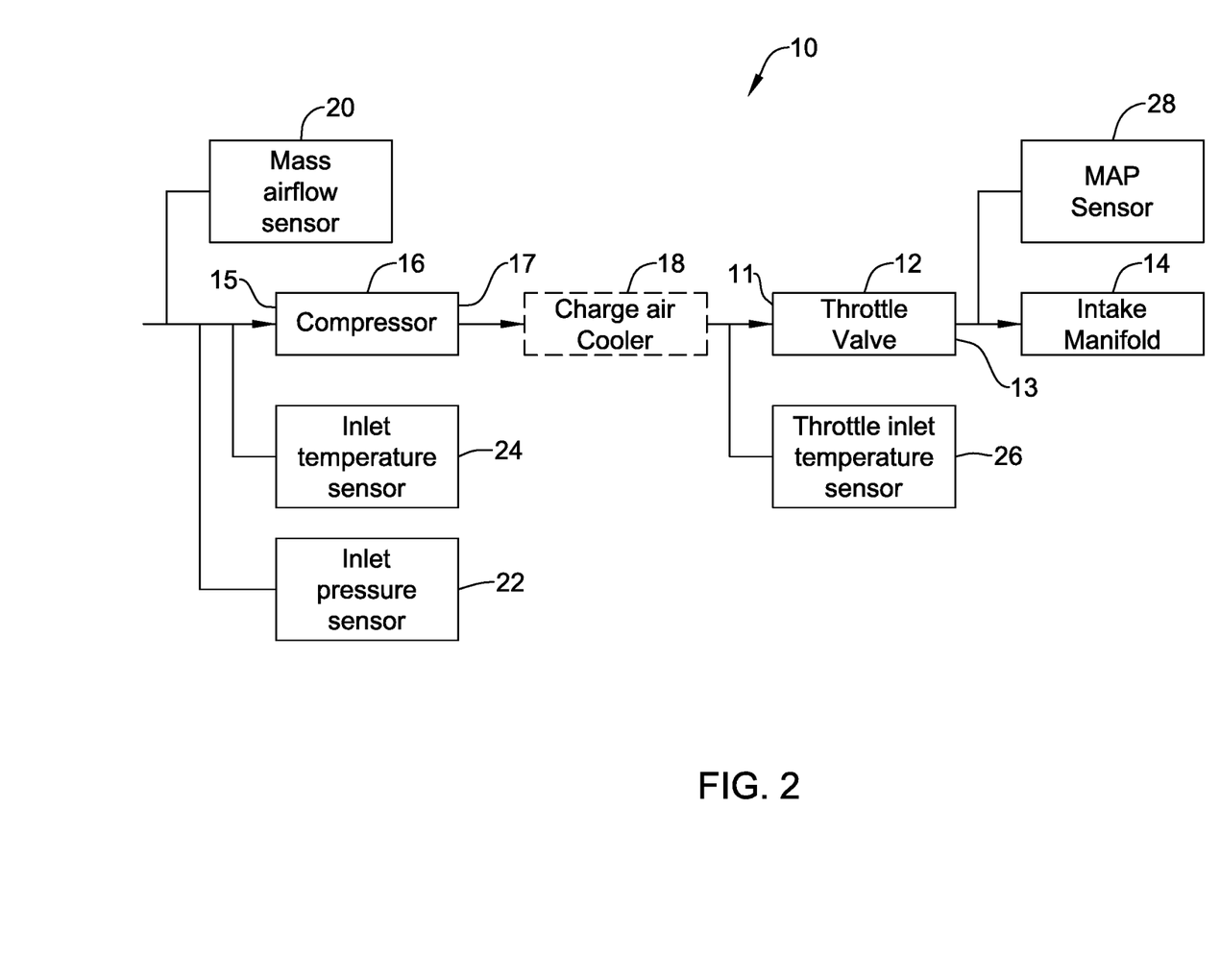
FIG. 2 is a schematic diagram of the air inlet system of FIG. 1, with the addition of particular sensors.

FIG. 2 provides another view of the illustrative air inlet system 10 of FIG. 1, with several sensors added as part of the engine management system. Many engines include a mass airflow sensor 20 that provides a mass flow rate for air entering the air inlet system 10, which may be used by an engine management system to determine a proper amount of fuel to add for proper combustion. An inlet pressure sensor 22 provides an indication of the air pressure upstream of the compressor 16. In some cases, this may provide an indication of ambient air pressure, but it will be recognized that ambient air pressure can vary with weather systems, altitude, temperature and other factors. An inlet temperature sensor 24 provides an indication of the air temperature of the air entering the compressor 16. In the example shown, a throttle inlet temperature sensor 26 provides an indication of the temperature of the air within the air inlet system 10 downstream of the compressor 16, near the air inlet 11 of the throttle valve 12. A Manifold Absolute Pressure (MAP) sensor 28 provides an indication of air pressure downstream of the throttle valve 12, such as at or in the intake manifold 14 of the engine. The MAP sensor 28 is commonly used on many modern engines for controlling the operation of the engine, such as controlling the operation of the fuel injectors (if present), engine timing, turbo speed, and/or other engine parameters.

Figure 3:
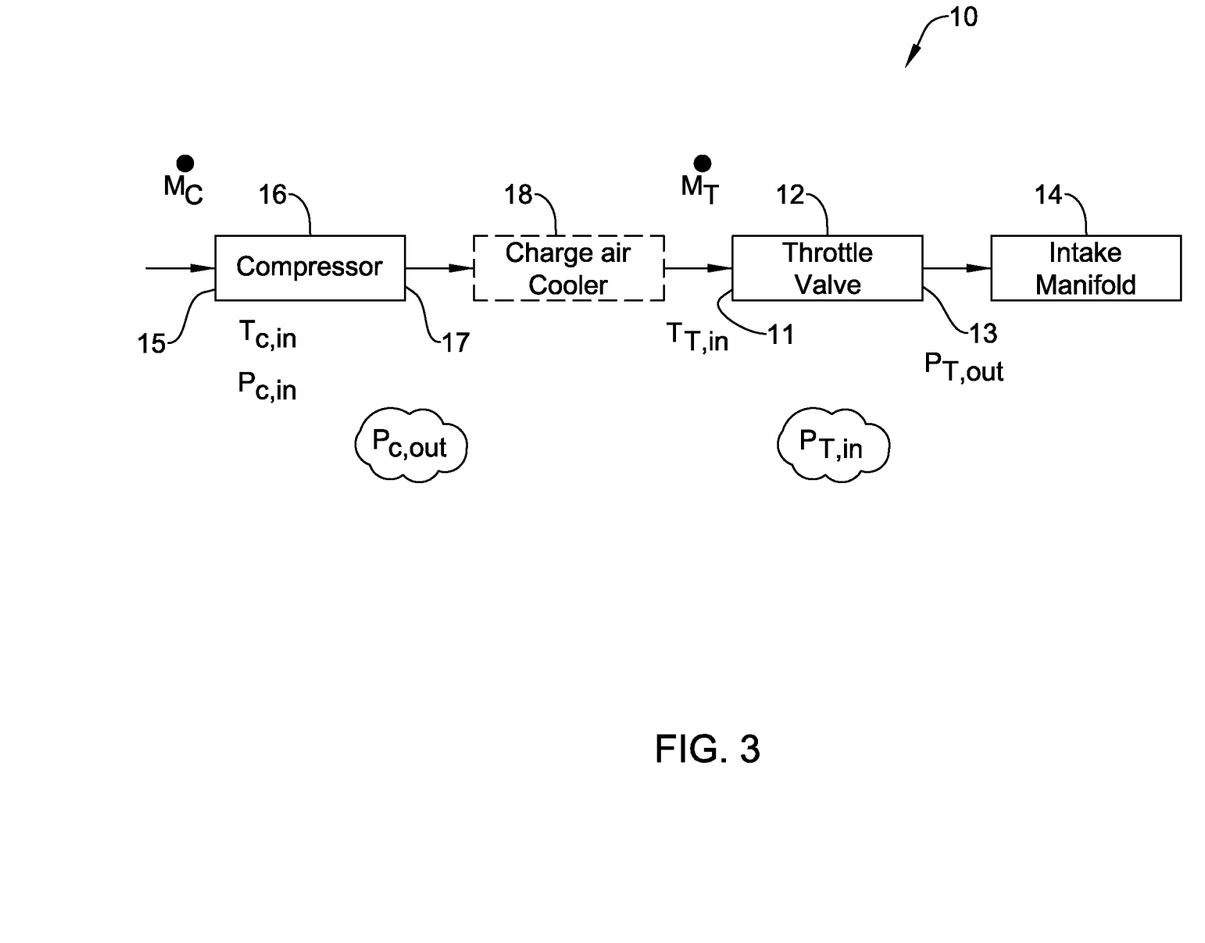
FIG. 3 is a schematic diagram of the air inlet system of FIG. 1, showing particular measured and estimated parameters.

FIG. 3 provides a view of the air inlet system 10, identifying some of the parameters useful in estimating turbocharger speed. The parameters shown in FIG. 3 may be measured using the sensors identified in FIG. 2. FIG. 3 also identifies parameters useful in estimating turbocharger speed that are not directly measured, but rather are calculated using the measured parameters. Moving left to right in FIG. 3, the parameter $\dot{m}_C$ represents an uncorrected mass flow rate, and may be measured via, for example, the mass airflow sensor 20 (see FIG. 2). The parameter $T_{C,in}$ represents a temperature of the air entering the air inlet 15 of the compressor 16, and may be measured using, for example, the inlet temperature sensor 24 (see FIG. 2). The parameter $p_{C,in}$ represents a pressure of the air entering the air inlet 15 of the compressor 16, and may be measured using, for example, the inlet pressure sensor 22 (see, FIG. 2). A corrected mass flow rate $\dot{m}_{C,Cor}$ may be calculated using the uncorrected mass flow rate $\dot{m}_C$, $p_{C,in}$, and $T_{C,in}$. Downstream of the charge air cooler 18 (if present), the parameter $\dot{m}_T$ is the mass flow rate through the throttle valve 12. In some cases, the parameter $\dot{m}_T$ is not measured, but rather is set equal to the mass flow rate $\dot{m}_C$ discussed above.

The parameter $p_{T,out}$ represents the pressure at the outlet of the throttle valve 12 and may be measured by the MAP sensor 28. The parameter $u_T$ represents a throttle command signal, which may provide an indication of a commanded throttle position, or perhaps an actual throttle position if different from the commanded throttle position. The throttle command signal $u_T$ may be provided by an engine management system.

These measured parameters, along with several reference values as will be further detailed below, may be used to calculate additional parameters. For example, the parameter $p_{T,in}$, which represents the pressure at the inlet of the throttle valve 12, may be calculated. The parameter $p_{C,out}$, which represents the pressure at the air outlet 17 of the compressor 16, may in some cases be set equal to the parameter $p_{T,in}$. In some cases, these calculated parameters, and ultimately the turbocharger speed, may be determined by simultaneously or sequentially solving several equations.

For example, in some cases the following turbocharger model expressed as a continuous function may be solved to calculate the turbocharger operating speed:

$$\dot{N}_{T,Cor} = \text{SOLVE}\{\Psi P_2(\Phi,M) - P_1(\Phi,M) = 0; P_2(\Phi,M) > 0\} \quad \text{(Equation 1)}$$

where $P_1$ and $P_2$ are bi-variate polynomials obtained by fitting compressor map data (often provided by the compressor manufacturer). In this equation, $\Phi$, $\Psi$, and M represent the following functions:

$$\Phi = \frac{4\dot{m}_{C,Cor} R T_{C,in}^{reference}}{p_{C,in}^{reference} \pi d_C^2 U_C}$$

$$\Psi = \frac{c_p T_{C,in}^{reference} \left(\left(\frac{p_{C,out}}{p_{C,in}}\right)^{\frac{\gamma-1}{\gamma}} - 1\right)}{1/2 U_C^2}$$

$$M = \frac{U_C}{\sqrt{\gamma R T_{C,in}^{reference}}}$$

In these equations, the following variables are defined, in addition to those discussed above:

$\dot{m}_{C,Cor}$ is the corrected compressor mass flow rate, which is based on an uncorrected mass flow rate $\dot{m}_C$ that can be provided by a mass flow sensor positioned at the inlet of the compressor:

$$\dot{m}_{C,Cor} = \dot{m}_C \frac{p_{C,in}^{reference}}{p_{C,in}} \sqrt{\frac{T_{C,in}}{T_{C,in}^{reference}}}.$$

$T_{C,in}^{reference}$ is a reference compressor inlet temperature that corresponds to the compressor map, and is often provided by the compressor manufacturer along with the compressor map.

$p_{C,in}^{reference}$ is a reference compressor inlet pressure that corresponds to the compressor map, and is often provided by the compressor manufacturer along with the compressor map.

$U_C$ is (corrected) blade tip speed $\pi d_C \dot{N}_{T,Cor}/60$, where $d_C$ is the rotor wheel diameter.

$c_p$ is the specific heat of dry throttle command air, which is approximately 1006 J/(kg K).

$\gamma$ is the heat capacity ratio of the air, which is approximately 1.4.

R is the specific gas constant, which is approximately 287.058 J/(kg K) for the dry air.

In some cases, there may not be a pressure sensor that is positioned at the air outlet 17 of the compressor 16 to provide a value for $p_{C,out}$. Rather, in some cases, the parameter $p_{C,out}$ may be calculated using a throttle model, which solves for the parameter $p_{C,out}$. The throttle model solves for the compressor outlet pressure $p_{C,out}$, which is then used to determine the compressor speed as discussed above using the turbocharger model expressed in Equation 1. The following throttle model, expressed as a continuous function, may be solved to calculate the throttle input pressure $p_{T,in}$:

$$p_{T,in} = \text{Solve}\left\{\dot{m}_T - \frac{C_d(u_T)}{\sqrt{R}} \Psi_T\left(\frac{p_{T,in}}{p_{T,out}}\right) \frac{p_{T,in}}{\sqrt{T_{T,in}}} = 0\right\} \quad \text{(Equation 2)}$$

where $C_d(u)$ is the throttle discharge coefficient which is modeled as a rational polynomial function of the throttle command signal $u_T$. $\Psi_T$ represents the flow function valid for isoentropic expansion of the fluid as follows:

$$\Psi_T = \left(\frac{p_{T,in}}{p_{T,out}}\right)^{-\frac{1}{\gamma}} \sqrt{\frac{2\gamma}{\gamma-1}\left(1 - \left(\frac{p_{T,in}}{p_{T,out}}\right)^{\frac{1-\gamma}{\gamma}}\right)}$$

In these equations, the following variables are utilized:

$\dot{m}_T$ is the mass flow rate through the throttle valve, which is set equal to the mass flow rate through the compressor $\dot{m}_C$. As detailed above, $\dot{m}_C$ is based on the output of a mass airflow sensor 20 positioned at the inlet of the compressor 16.

$p_{T,in}$ is the pressure at the air inlet 11 of the throttle valve 12, which is calculated by the throttle model (e.g. Equation 2).

The above flow function $\Psi_T$ saturates (becomes constant) for supersonic flows, i.e. when:

$$\frac{p_{T,in}}{p_{T,out}} > \left(\frac{2}{\gamma+1}\right)^{\frac{\gamma}{1-\gamma}}.$$

In some cases, once the throttle input pressure $p_{T,in}$ is calculated using the throttle model (e.g. via Equation 2), the throttle input pressure $p_{T,in}$ is used as the compressor outlet pressure $p_{C,out}$ when determining the compressor speed using the illustrative turbocharger model expressed in Equation 1.

Figure 4:
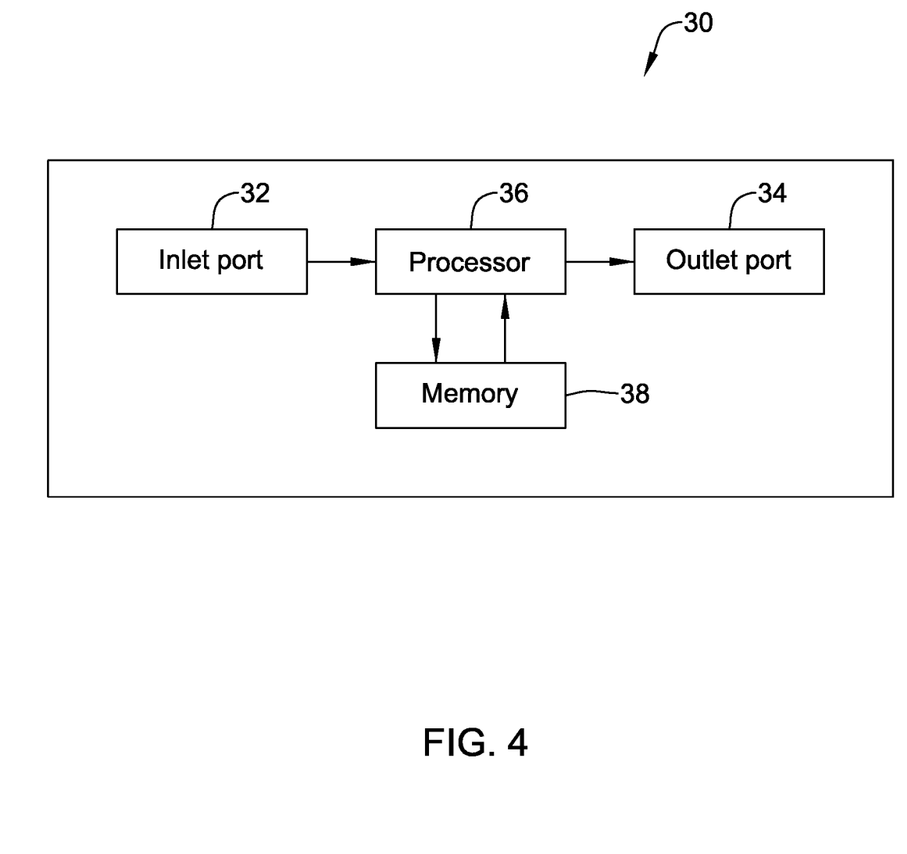
FIG. 4 is a schematic diagram of a controller that may be used in combination with the air inlet system of FIG. 1 to estimate the turbocharger speed of the turbocharger.

FIG. 4 is a schematic diagram of a controller 30 that may be used in combination with the air inlet system of FIG. 1 to process the above-referenced parameters to calculate the turbocharger speed. In some cases, the controller 30 may be a standalone controller or computer. In some cases, the controller 30 may be manifested as a component of the aforementioned engine management system. The controller 30 may include an input port 32 and an output port 34. A processor 36 may be operatively coupled to the input port 32 and to the output port 34. A memory 38 may be coupled to the processor 36 and may, for example, store instructions that are executable by the processor 36 to estimate the speed of the compressor 16. In some cases, the processor 36 may estimate the turbocharger speed within the confines of a unitary model. In some cases, the processor 36 may estimate an air pressure at an outlet of the compressor 16 using a throttle model, and estimate the turbocharger speed using the air pressure provided by the throttle model in combination with a turbocharger model.

Figure 5:
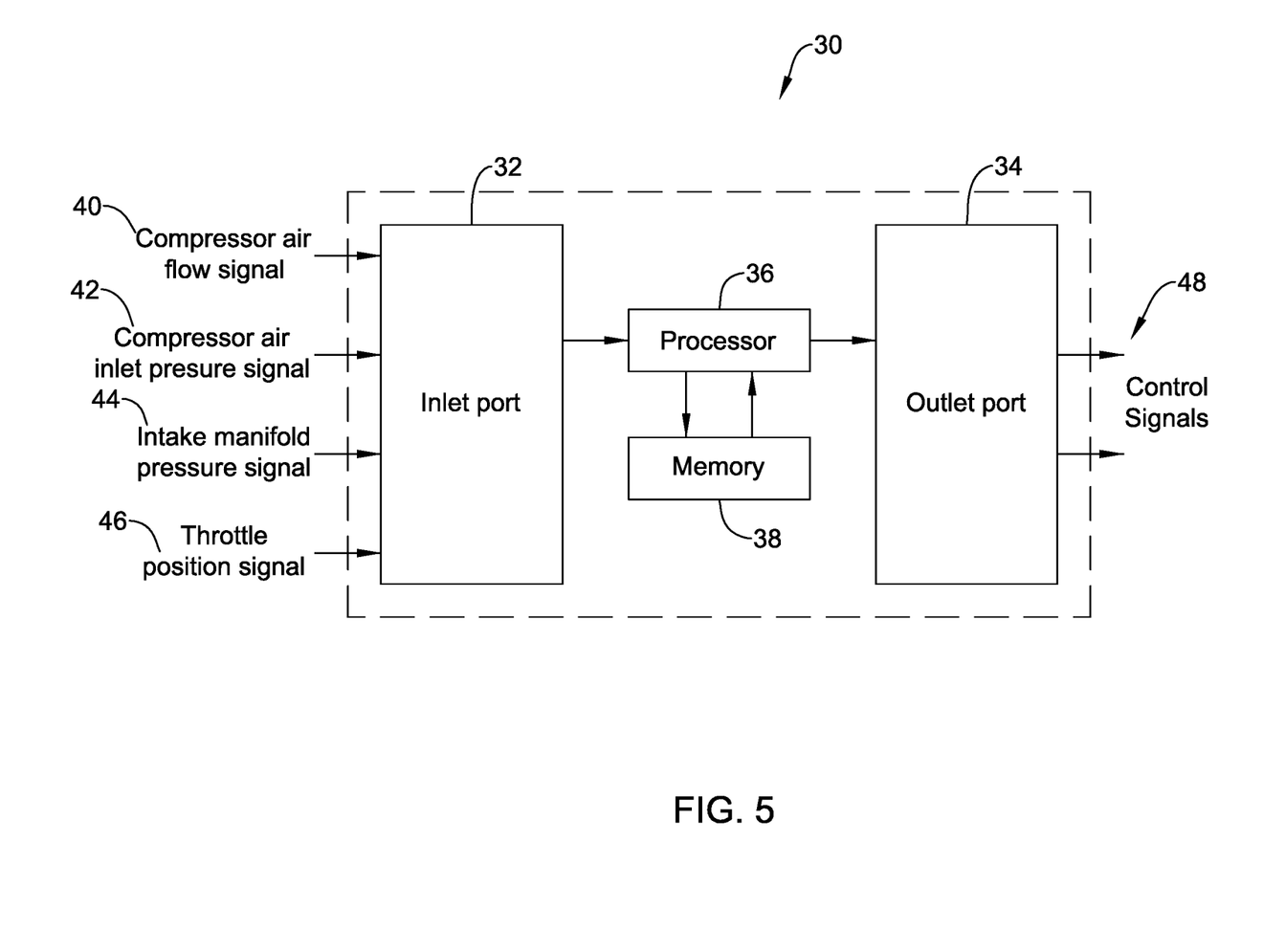
FIG. 5 is a schematic diagram of the controller of FIG. 4, showing illustrative inputs and outputs of the controller.

In FIG. 5, it can be seen that there are several inputs to the input port 32. For example, the inputs to the input port 32 may include a compressor air flow signal 40 representing a measure of air flow through the compressor 16, a compressor air inlet pressure signal 42 representing a measure of pressure at the air inlet 15 of the compressor 16, an intake manifold pressure signal 44 representing a measure of pressure at the air intake manifold 14, and a throttle position signal 46 that represents the throttle position of the throttle valve 12. In some cases, processor 36, utilizing the throttle model (e.g. Equation 2), estimates an air pressure at the air outlet 17 of the compressor 16 referencing at least the throttle signal and the measure of pressure at the air intake manifold 14 of the engine. In some cases, the throttle model also references a measure of temperature of the air at the throttle valve 12. In some cases, the throttle model also references a measure of air flow through the compressor 16. In some instances, the throttle model models the effects of the charge air cooler 18, when present. In some cases, the throttle model further references a measure of a temperature of the air in the throttle valve 12, where the measure is taken downstream of the charge air cooler 18 and upstream of the throttle valve 12.

In some cases, the processor 36 of the controller 30, utilizing the turbocharger model (e.g. Equation 1), estimates the operating speed of the turbocharger referencing at least the measure of air flow through the compressor 16, the measure of pressure at the air inlet 15 of the compressor 16 and the estimated air pressure at the air outlet 17 of the compressor 16 (e.g. as estimated by the throttle model). In some cases, the turbocharger model also references a measure of temperature of the air at the air inlet 15 of the compressor 16. In some instances, the turbocharger model further references one or more of the specific heat of air, the heat capacity of air and/or the specific gas constant of air. In some cases, the processor 36 provides, via the output port 34, one or more control signals 48 that may be used to control an operation of the turbocharger and/or the engine in response to the estimated operating speed of the turbocharger.

Figure 6:
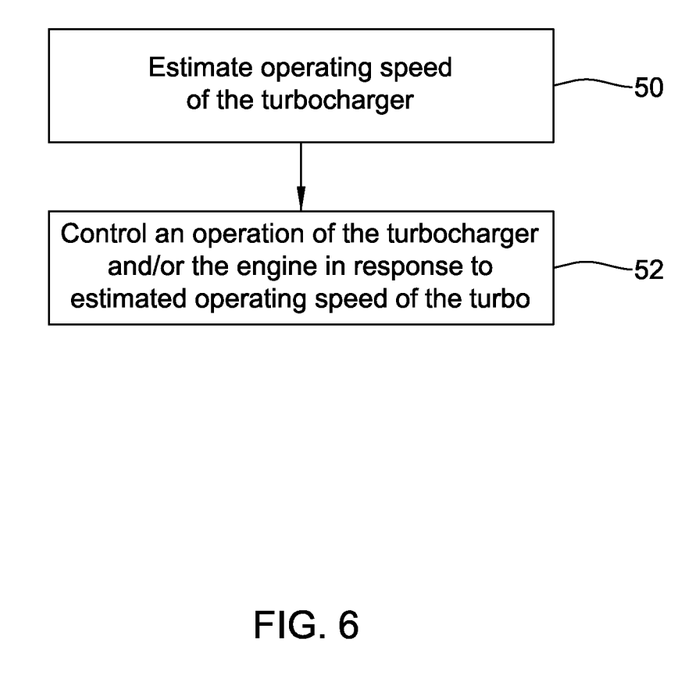
FIG. 6 is a flow diagram showing an illustrative method of operating an engine and/or turbocharger.

FIG. 6 is a flow diagram of an illustrative method for estimating an operating speed of a turbocharger that has a compressor 16 with an air inlet 15 and an air outlet 17. The compressor 16 feeds compressed air to a downstream throttle, such as the throttle valve 12, which provides a throttled air flow to an air intake manifold of an engine, such as the air intake manifold 14. As generally referenced at block 50, the operating speed of the turbocharger may be estimated. In some cases, the estimated operating speed of the turbocharger may be based, at least in part, upon one or more of a measure of air flow through the compressor 16, a measure of pressure at the air inlet 15 of the compressor 16, a measure of pressure at the air intake manifold 14 of the engine, and/or a throttle signal that represents the throttle position of the throttle. As generally referenced at block 52, operation of the turbocharger and/or the engine may be controlled in response to the estimated operating speed of the turbocharger.

In some cases, estimating the operating speed of the turbocharger as referenced at block 50 may also be based on a measure of temperature of the air at the air inlet 15 of the compressor 16. In some cases, estimating the operating speed of the turbocharger as referenced at block 50 may also be based on a measure of temperature of the air at the throttle. In some cases, estimating the operating speed of the turbocharger as referenced at block 50 may also be based on a measure of temperature of the air at the air inlet of the compressor and a measure of temperature of the air at the throttle.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments.

What is claimed is:

1. A controller for estimating an operating speed of a turbocharger that has a compressor with an air inlet and an air outlet, the compressor feeding compressed air to a downstream throttle that provides a throttled air flow to an air intake manifold of an engine, the controller comprising:

an input port for receiving:
 a compressor air flow signal that represents a measure of air flow through the compressor;
 a compressor air inlet pressure signal that represents a measure of pressure at the air inlet of the compressor;
 an intake manifold pressure signal that represents a measure of pressure at the air intake manifold of the engine;
 a throttle signal that represents the throttle position of the throttle;
an output port;

a processor operatively coupled to the input port and the output port;
memory having instructions stored therein that are executable by the processor to:
estimate an air pressure at the air outlet of the compressor by solving a throttle model expressed as a continuous function including a throttle discharge coefficient modeled as a rational polynomial function of the throttle command signal;
estimate the operating speed of the turbocharger using a turbocharger model expressed as a continuous function including two bi-variate polynomials obtained by fitting compressor map data; and
provide one or more control signals via the output port to control an operation of the turbocharger in response to the estimated operating speed of the turbocharger.

2. The controller of claim 1, wherein the turbocharger model further references a measure of temperature of the air at the air inlet of the compressor.

3. The controller of claim 1, wherein the turbocharger model further references the specific heat of air, the heat capacity ratio of air, and the specific gas constant of air.

4. The controller of claim 1, wherein the throttle model further references a measure of temperature of the air at the throttle.

5. The controller of claim 1, wherein the throttle model further references the measure of air flow through the compressor.

6. The controller of claim 1, wherein the measure of pressure at the air intake manifold of the engine is provided by a Manifold Air Pressure (MAP) sensor.

7. The controller of claim 1, wherein the measure of air flow through the compressor is provided by a flow sensor at the air inlet of the compressor.

8. The controller of claim 1, wherein the measure of pressure at the air inlet of the compressor is provided by a pressure sensor at the air inlet of the compressor.

9. The controller of claim 1, wherein:
the throttle model references at least a current value of the throttle signal and a current value of the measure of pressure at the air intake manifold of the engine;
estimating the air pressure at the air outlet of the compressor using the throttle model includes solving the one or more equations of the throttle model without iterating over a time variable;
the turbocharger model reference at least a current value of the measure of air flow through the compressor, a current value of the measure of pressure at the air inlet of the compressor, and a current value of the estimated air pressure at the air outlet of the compressor; and
estimating the operating speed of the turbocharger using the turbocharger model includes solving the one or more equations for the turbocharger model without iterating over a time variable.

10. A controller for estimating an operating speed of a turbocharger that has a compressor with an air inlet and an air outlet, the compressor feeding compressed air to a downstream throttle that provides a throttled air flow to an air intake manifold of an engine, the controller comprising:
an input port for receiving:
a compressor air flow signal that represents a measure of air flow through the compressor;
a compressor air inlet pressure signal that represents a measure of pressure at the air inlet of the compressor;
an intake manifold pressure signal that represents a measure of pressure at the air intake manifold of the engine;
a throttle signal that represents the throttle position of the throttle;
an output port;
a processor operatively coupled to the input port and the output port;
memory having instructions stored therein that are executable by the processor to:
estimate the operating speed of the turbocharger based at least in part on a continuous function including two bi-variate polynomials obtained by fitting compressor map data, wherein the continuous function references at least:
a current value of the measure of air flow through the compressor; and
a current value of the measure of pressure at the air inlet of the compressor; and
provide one or more control signals via the output port to control an operation of the turbocharger and/or the engine in response to the estimated operating speed of the turbocharger.

11. The controller of claim 10, wherein estimating the operating speed of the turbocharger is also based on a measure of temperature of the air at the air inlet of the compressor.

12. The controller of claim 10, wherein estimating the operating speed of the turbocharger is also based on a measure of temperature of the air at the throttle.

13. The controller of claim 10, wherein the measure of pressure at the air intake manifold of the engine is provided by a Manifold Air Pressure (MAP) sensor.

14. The controller of claim 10, wherein the measure of air flow through the compressor is provided by a flow sensor at the air inlet of the compressor.

15. The controller of claim 10, wherein the measure of pressure at the air inlet of the compressor is provided by a pressure sensor at the air inlet of the compressor.

16. The controller of claim 10, wherein estimating the operating speed of the turbocharger includes solving the continuous function, wherein the continuous function references at least:
a current value of the measure of pressure at the air intake manifold of the engine; and
a current value of the throttle signal.

17. A method for estimating an operating speed of a turbocharger that has a compressor with an air inlet and an air outlet, the compressor feeding compressed air to a downstream throttle that provides a throttled air flow to an air intake manifold of an engine, the method comprising:
estimating the operating speed of the turbocharger based at least in part on:
a measure of air flow through the compressor;
a measure of pressure at the air inlet of the compressor;
a measure of pressure at the air intake manifold of the engine;
a throttle signal that represents the throttle position of the throttle;
wherein estimating the operating speed of the turbocharger includes solving a turbocharger model expressed as a continuous function including two bi-variate polynomials obtained by fitting compressor map data, wherein the continuous function references at least a current value of the measure of air flow through the compressor and a current value of the measure of pressure at the air inlet of the compressor; and controlling an operation of the turbocharger and/or the engine in response to the estimated operating speed of the turbocharger.

18. The method of claim 17, wherein the estimating the operating speed of the turbocharger is also based on a measure of temperature of the air at the air inlet of the compressor.

19. The method of claim 17, wherein the estimated operating speed of the turbocharger is also based on a measure of temperature of the air at the throttle.

20. The method of claim 17, wherein the estimated operating speed of the turbocharger is also based on a measure of temperature of the air at the air inlet of the compressor and a measure of temperature of the air at the throttle.

* * * * *